(12) United States Patent
Ruiz

(10) Patent No.: US 9,900,417 B1
(45) Date of Patent: Feb. 20, 2018

(54) VEHICLE MOUNTED ELECTRONIC DEVICE ENCLOSURE

(71) Applicant: Steve Ruiz, Selma, TX (US)

(72) Inventor: Steve Ruiz, Selma, TX (US)

(*) Notice: Subject to any disclaimer, the term of this patent is extended or adjusted under 35 U.S.C. 154(b) by 0 days.

(21) Appl. No.: 15/260,902

(22) Filed: Sep. 9, 2016

(51) Int. Cl.
- *H04M 1/667* (2006.01)
- *B60R 11/02* (2006.01)
- *B60R 11/00* (2006.01)

(52) U.S. Cl.
CPC ......... *H04M 1/667* (2013.01); *B60R 11/0241* (2013.01); *B60R 11/0264* (2013.01); *B60R 2011/0005* (2013.01)

(58) Field of Classification Search
CPC ............... H04M 1/667; B60R 11/0241; B60R 11/0264; B60R 2011/0005
USPC .................................................. 340/5.7–5.72
See application file for complete search history.

(56) References Cited

U.S. PATENT DOCUMENTS

| 8,412,123 B2* | 4/2013 | Foster | H04K 3/415 455/134 |
|---|---|---|---|
| 9,079,494 B2 | 7/2015 | Skelton | |
| 2013/0151111 A1 | 6/2013 | Skelton | |
| 2014/0024347 A1 | 1/2014 | Carter | |
| 2015/0230042 A1 | 8/2015 | McGuire | |

FOREIGN PATENT DOCUMENTS

WO    WO2013090282    6/2013

* cited by examiner

*Primary Examiner* — Allen T Cao
(74) *Attorney, Agent, or Firm* — Goldstein Law Offices, P.C.

(57) ABSTRACT

An enclosure for use in a vehicle having an ignition system, for securely holding an electronic device and rendering it inaccessible during operation of the vehicle. The enclosure has a main part and a door. The door has an open position and a closed position and includes a device cradle for holding the electronic device. A device responsive switch is closed when the electronic device is located within the device cradle, and a door responsive switch is closed when the door is in the closed position. When the ignition is on, the door responsive switch and device responsive switch must both be closed for the vehicle to operate. A locking assembly holds the door in the closed position and is activated while the vehicle is in operation to physically prevent access to the electronic device while the vehicle is in operation.

14 Claims, 6 Drawing Sheets

VEHICLE MOUNTED ELECTRONIC DEVICE ENCLOSURE

TECHNICAL FIELD

The present disclosure relates generally to an electronic device enclosure. More particularly, the present disclosure relates to a system for preventing electronic device usage while operating a motor vehicle, by requiring the electronic device to be locked within the enclosure while the vehicle is in operation.

BACKGROUND

Distracted driving is a major problem, leading to countless injuries and deaths, as well as significant property damage. Today, the most common form of distracted driving results from talking or texting with a cellphone. The problem is significant enough that legislation has been enacted nationwide to make it unlawful to engage in cell phone use while driving.

For businesses that operate fleets of vehicles, having their employees operate vehicles while distracted by electronic devices is a major concern. Such businesses are legally responsible for the conduct of their employees carried out in the course of business, and will incur significant financial responsibility when an accident occurs and someone is injured by their employee. Aside from the resulting increase in insurance rates and responsibility for losses beyond insurance coverage, an accident caused by one of their employees can result in devastatingly bad publicity for the company.

As a result, companies have struggled to find an effective solution to prevent electronic device usage by their employees while driving. They enact rules and policies, sometimes with penalties and consequences. But none of these measures seem effective at stopping their employees from making a momentary exception to 'just check their phone'.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system that prevents electronic device usage by a driver while driving a motor vehicle. Accordingly, the present disclosure provides an enclosure that renders an electronic device inaccessible to the driver while the vehicle is in operation.

It is another aspect of an example embodiment in the present disclosure to provide a system that prevents vehicle operation while the electronic device is accessible. Accordingly, the system requires both that the electronic device be placed within the disclosure and that the enclosure door is closed for the vehicle to operate.

It is yet another aspect of an example embodiment in the present disclosure to provide a system that prevents the driver from accessing the electronic device while the vehicle is in operation. Accordingly, the enclosure includes a locking device that holds the enclosure in a closed position as long as the vehicle is in an operating mode. In particular, the locking device may include a strong electromagnet that remains active as long as the vehicle ignition is on.

It is a still further aspect of an example embodiment in the present disclosure to provide a system that encourages the driver to place the electronic device in the enclosure during vehicle operation. Accordingly, the enclosure may include interchangeable charging cradles, and provision for a changing cable, such that the electronic device may be charged while within the enclosure.

Accordingly, the present disclosure describes an enclosure for use in a vehicle having an ignition system, for securely holding an electronic device and rendering it inaccessible during operation of the vehicle. The enclosure has a main part and a door. The door has an open position and a closed position and includes a device cradle for holding the electronic device. A device responsive switch is closed when the electronic device is located within the device cradle, and a door responsive switch is closed when the door is in the closed position. When the ignition is on, the door responsive switch and device responsive switch must both be closed for the vehicle to operate. A locking assembly holds the door in the closed position and is activated while the vehicle is in operation to physically prevent access to the electronic device while the vehicle is in operation.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
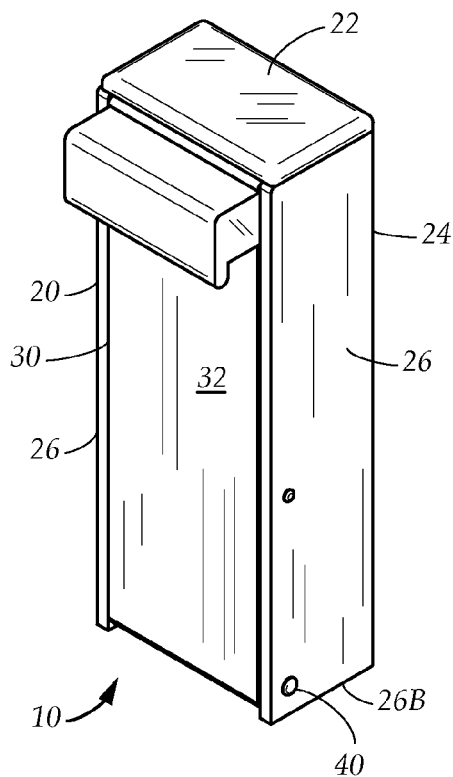
FIG. 1 is a diagrammatic perspective view, illustrating an enclosure in accordance with the principles of the present disclosure, with its door in a closed position.
Figure 2:
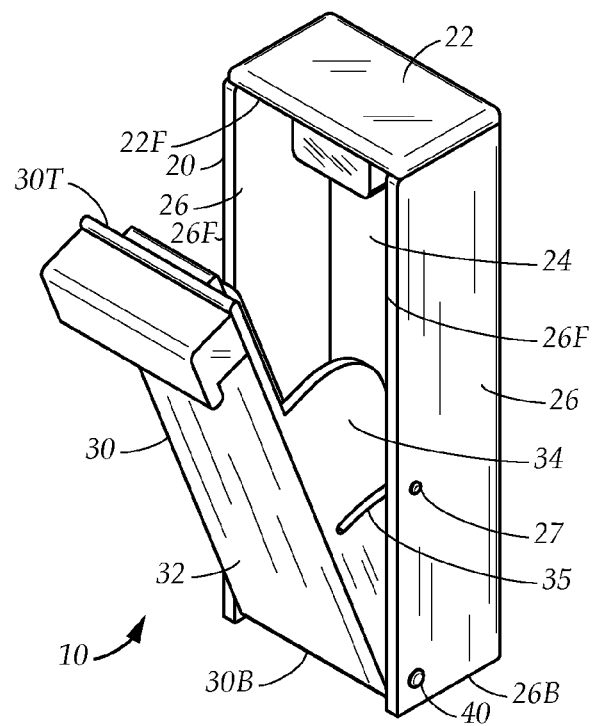
FIG. 2 is a diagrammatic perspective view, similar to FIG. 1, except wherein the door is in an open position.

FIG. 1 and FIG. 2 illustrate an electronic device enclosure 10 having a main part 20, and a door 30. The main part 20 includes a top panel 22, a rear panel 24, and a pair of main side panels 26 that meet orthogonally and are secured together. The top panel 22 and main side panels 26 have front edges 22F, 26F, such that the main part is open at the front edges 22F, 26F and substantially closed at the rear panel 24. The door 30 includes a front panel 32, and at least one door side panel 34. The door 30 has a top edge 30T and a bottom edge 30B. The door 30 is hingedly attached to the main part 20 along the bottom edge 30B, such that the door 30 has an open position wherein it extends angularly away from the main part 20 from near the bottom edge 30B, and a closed position wherein the front panel 32 extends substantially coincident with the front edges 22F, 26F of the top 22 and sides 26 of the main part 20.

The door 30 is hingedly attached to the main part 20, and the door 30 has an open position and a closed position. The door 30 and main part 20 together define an interior volume adapted for containing an electronic device. The door is hingedly attached near the bottom edge 30B of the door 30 and near the bottom edge 26B of the main side panels 26B with a hinge pin 40. When the door is in the open position, there is a space between the top edge 30T of the door 30 and the front edge 22F of the top panel 22 of the main part 20. When in the open position, an electronic device can be inserted into the interior volume so that it may be held within the enclosure 10 as described in further detail hereinbelow. The door side panel 34 has an arcuate slot 35, and the main part 20 has a guide pin 27. The guide pin 27 extending inwardly from one of the main side panels 26 into and engaging the arcuate slot 35. The guide pin 27 within the arcuate slot 35 acts to create a range of travel for the door 20 between its open and closed positions.

Figure 3:
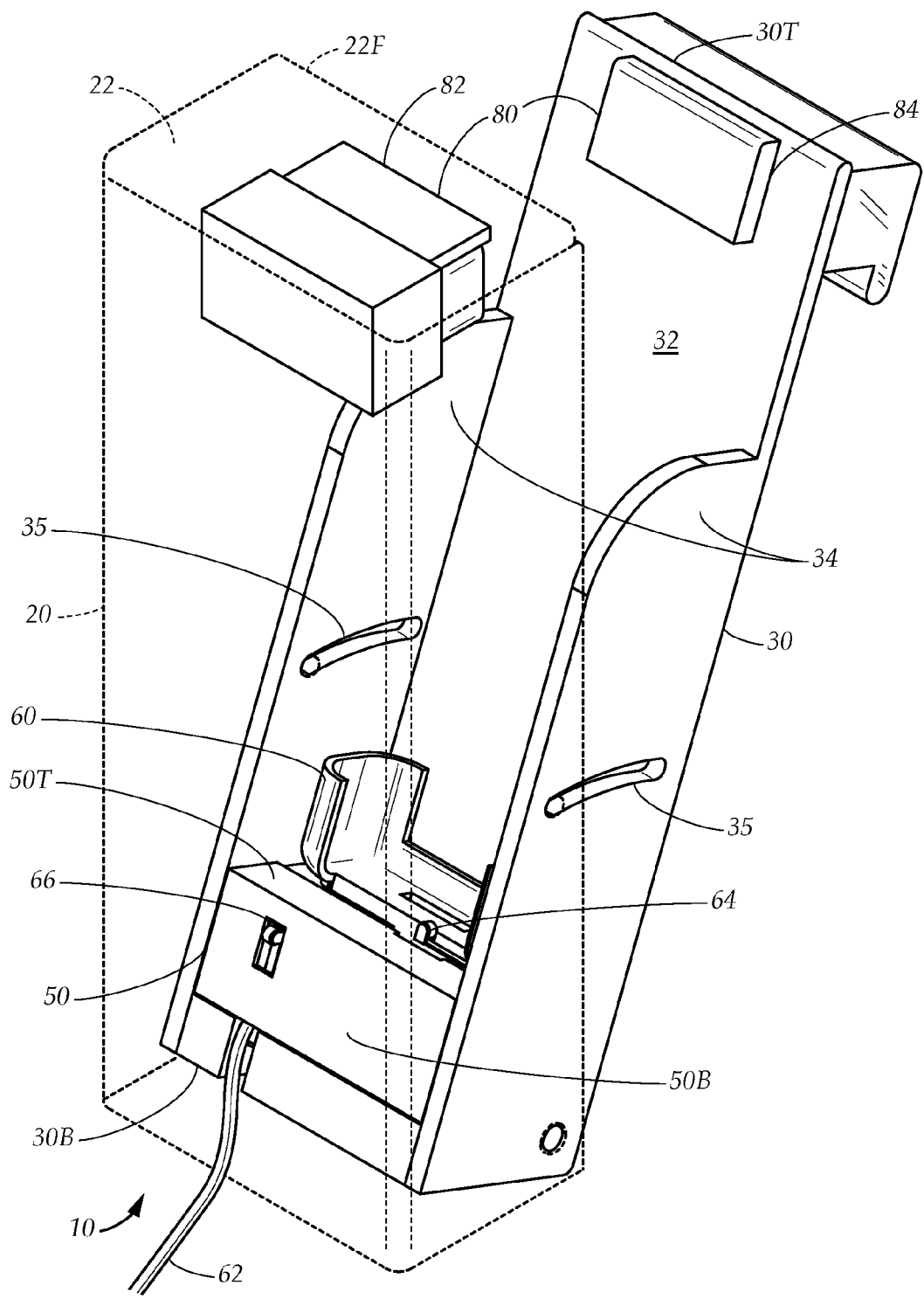
FIG. 3 is a diagrammatic perspective view with parts broken away, illustrating internal details of the enclosure.

FIG. 3 depicts the main part 20 in phantom lines, revealing features of the door 30 that are typically obscured from view by the main part 20. In particular, two side panels 34 are illustrated, each having its own arcuate slot 35. The door 30 also has a base 50, having a base top panel 50T and a base back panel 50B. The base 50 extends between the door side panels 34 and the front panel 32, and is located near the bottom edge 30B of the door 30.

The base 50 includes a device cradle 60 that is attached to the base top panel 50T. The device cradle 60 is configured for holding an electronic device of the user. Note that the device cradle 60 can be sized and shaped to accommodate different electronic devices, and can also be configured to be easily interchangeable with other device cradles 60 to accommodate different electronic devices. In addition, a connection cable 62 may provided, extending into the base 50 near the bottom edge 30B of the door 30. The connection cable facilitates interconnection with the vehicle ignition to provide the core functionality described hereinbelow. The connection cable may also be in communication with the device cradle 60 to facilitate charging an electronic device while located within the enclosure 10. The enclosure 10 may also be configured to allow a dedicated charging cable to extend into the enclosure to connect to the electronic device while in the device cradle 60.

The enclosure 10 has a device responsive switch 64 for detecting when an electronic device is located within the enclosure 10. In particular, the device responsive switch 64 is configured to close (be "closed circuited") when the electronic device located within the enclosure. As indicated in FIG. 3, the device responsive switch 64 may be located at the base top panel 50T, immediately adjacent to the device cradle 60. In addition, the enclosure 10 has a door responsive switch 66 that is configured to close when the door 30 is in its closed position. Accordingly, the door responsive switch 66 may be positioned on the base back panel 50B. The enclosure also has a locking device 80, for maintaining the door 30 in the closed position. The locking device 80 may include an electromagnet 82, located within the main part 20, and a magnetically attractive plate 84 located on the door 30. In particular, the electromagnet 82 is preferably located near the front edge 22F of the top panel 22 of the main part 20. The magnetically attractive plate 84 is preferably located on the front panel 32 of the door 30, near the top edge 30T of the door 30.

Figure 4:
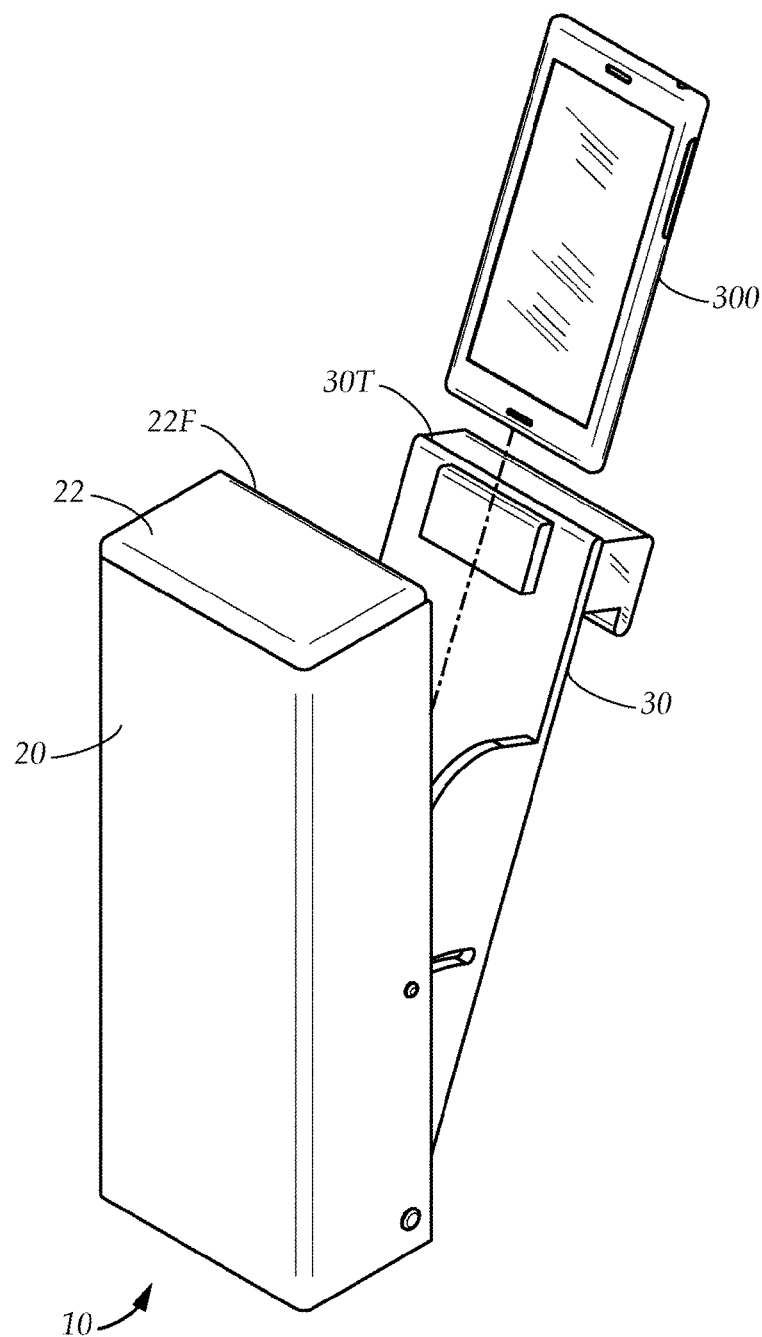
FIG. 4 is a diagrammatic perspective view, illustrating an electronic device being inserted into the enclosure.

Referring to FIG. 4, an electronic device 300 is illustrated. The electronic device 300 may be a cell phone, smartphone, PDA, or the like. During ordinary usage of the enclosure 10, the electronic device is placed within the enclosure 10 when the door 30 is in its open position, by placing the electronic device through the space between the top edge 30T of the door 30 and the front edge 22F of the top panel 22 of the main part 20. The space provided for doing such is dictated by the range of travel of the door 30 as described hereinabove.

Figure 6:
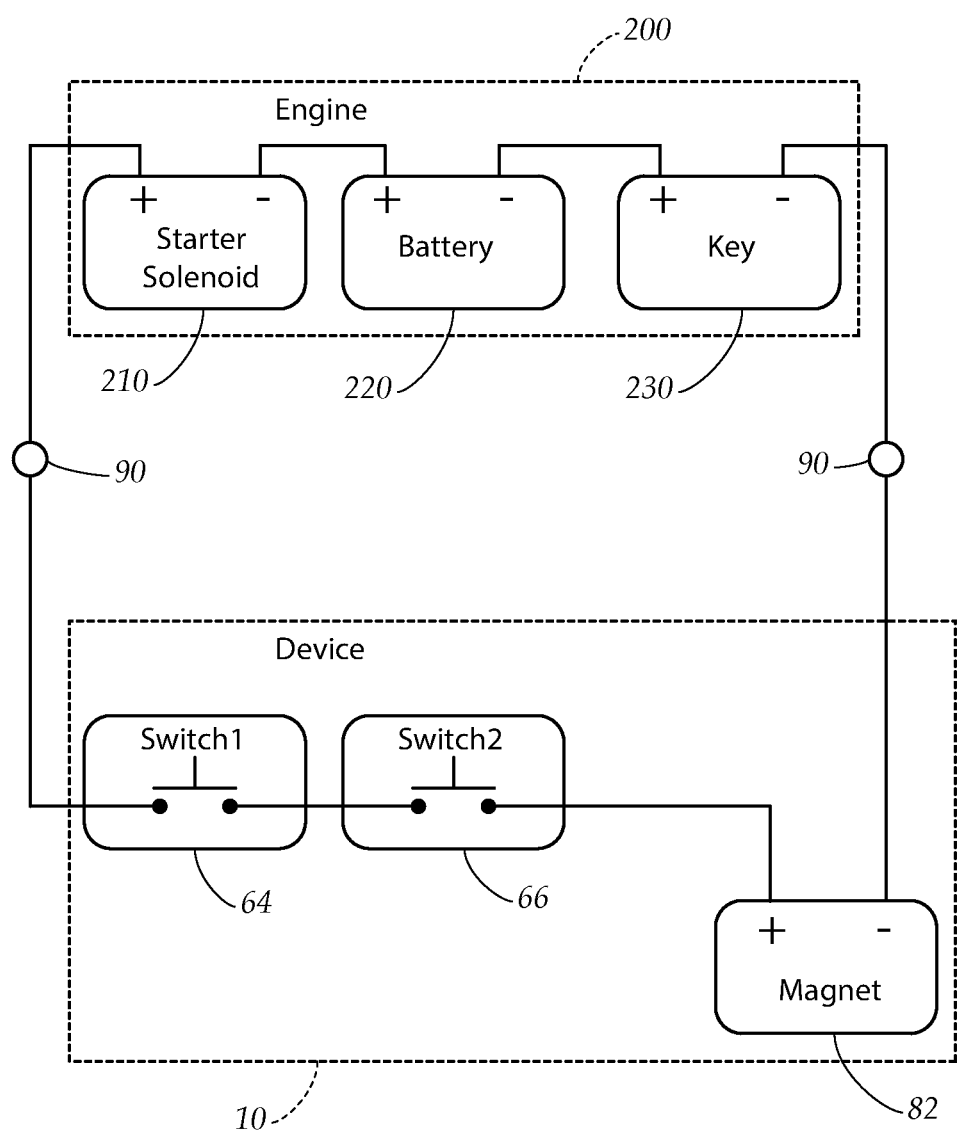
FIG. 6 is a schematic diagram, illustrating electrical interconnection of components of the system, according to an embodiment of the present disclosure.

FIG. 6 provides a block diagram, providing an example of electrical interconnection of various components of the system described herein. Note that this depiction provides a workable example, and may be varied significantly while still providing the functionality of the present disclosure. The enclosure 10 is shown connected to a vehicle electrical system 200. The enclosure 10 has a pair of main contacts 90, which may be provided through the connection cable 62 seen in FIG. 3. The vehicle electrical system 200 includes a starter solenoid 210, a battery 220, and an ignition key 230—all connected in series, such that the starter solenoid 210 is connected to one of the main contacts 90, and the ignition key 230 is connected to the other of the main contacts 90. The ignition key 230 is part of a vehicle ignition system, which is selectively on or off. In addition, the device responsive switch 64, the door responsive switch 66, and the electromagnet 82 are all connected in series, between the main contacts 90. Accordingly, when the ignition key 230 is closed (the ignition is turned on), the device responsive switch 64 and door responsive switch 66 are closed, the main contacts 90 are closed, such that a path is provided between the main contacts 90, and thus the starter solenoid 210 is energized or enabled, and the electromagnet 82 is energized. When the ignition key 230 is open (the ignition is turned off), both the electromagnet 82 and the starter solenoid 210 is de-energized or disabled. When either the door responsive switch 66 or the device responsive switch 64 is open, the main contacts 90 are open circuited. Note that the precise integration of the enclosure with the vehicle ignition system may be varied, while maintaining the intention of disabling operation of the vehicle when the switches 64, 66 are not closed.

Figure 5A:
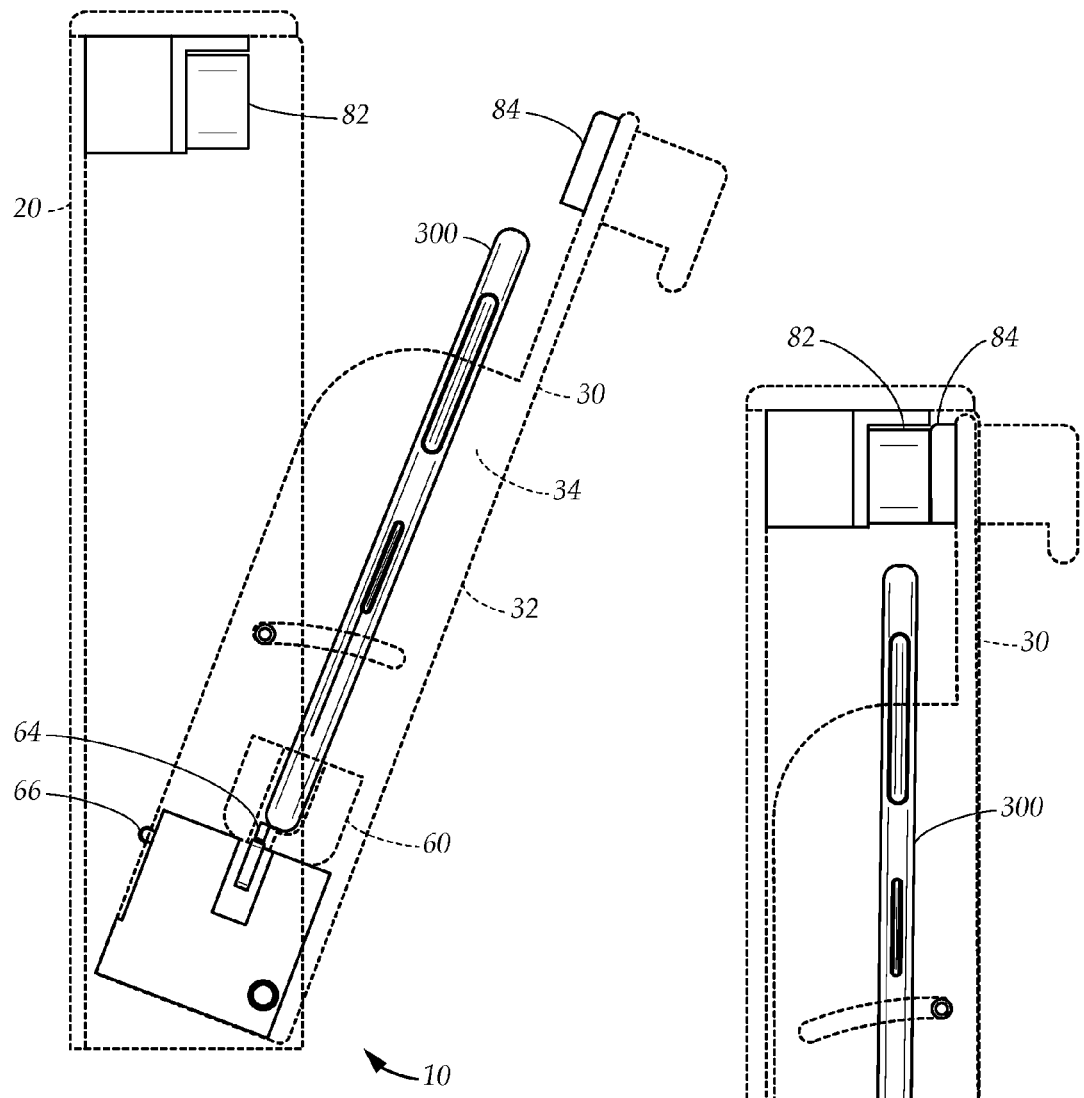
FIG. 5A is a side elevational view with parts broken away, illustrating the phone positioned within the enclosure, while the enclosure is in the open position.

Referring now to FIG. 5A, the door 30 is in the open position. The electronic device 300 is located fully within the door 30, extending between the door side panels 34, and extending substantially parallel to the door front panel 32. The electronic device 300 is held in place within the device cradle 60. As illustrated in FIG. 5A, the device responsive switch 64 may be configured to actuate (and close) by physically contacting the electronic device 300, and may be alternatively configured to be responsive to the device cradle 60 so as to indirectly detect the presence of the electronic device 300 therein. In the open position, the door responsive switch 66 does not contact the main part 20, and thus is open circuited. Also note in FIG. 5A, with the door 30 in the open position, the magnetically attractive plate 84 of the door 30 is separated from the electromagnet 82 in the main part 20.

Figure 5B:
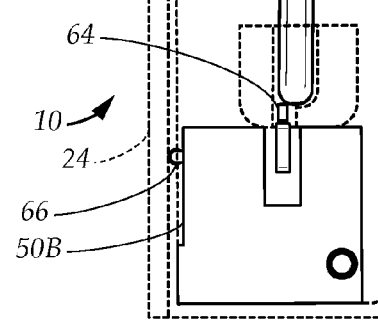
FIG. 5B is a side elevational view with parts broken away, illustrating the phone positioned within the enclosure, while the enclosure is in the closed position.

FIG. 5B shows the door 30 in the closed position, with the electronic device 300 secured within the interior volume of the enclosure 10. In this position of the door 30, the door responsive switch 66 is closed by the base back panel 50B being in close proximity to the rear panel 24. Accordingly, with the electronic device 300 causing the device responsive switch 64 to close, the main contacts are closed circuited, and if connected to a suitable power source such as the ignition key, the electromagnet 82 will strongly attract the magnetically attractive plate 84 to keep the door 30 securely closed.

Figure 7:
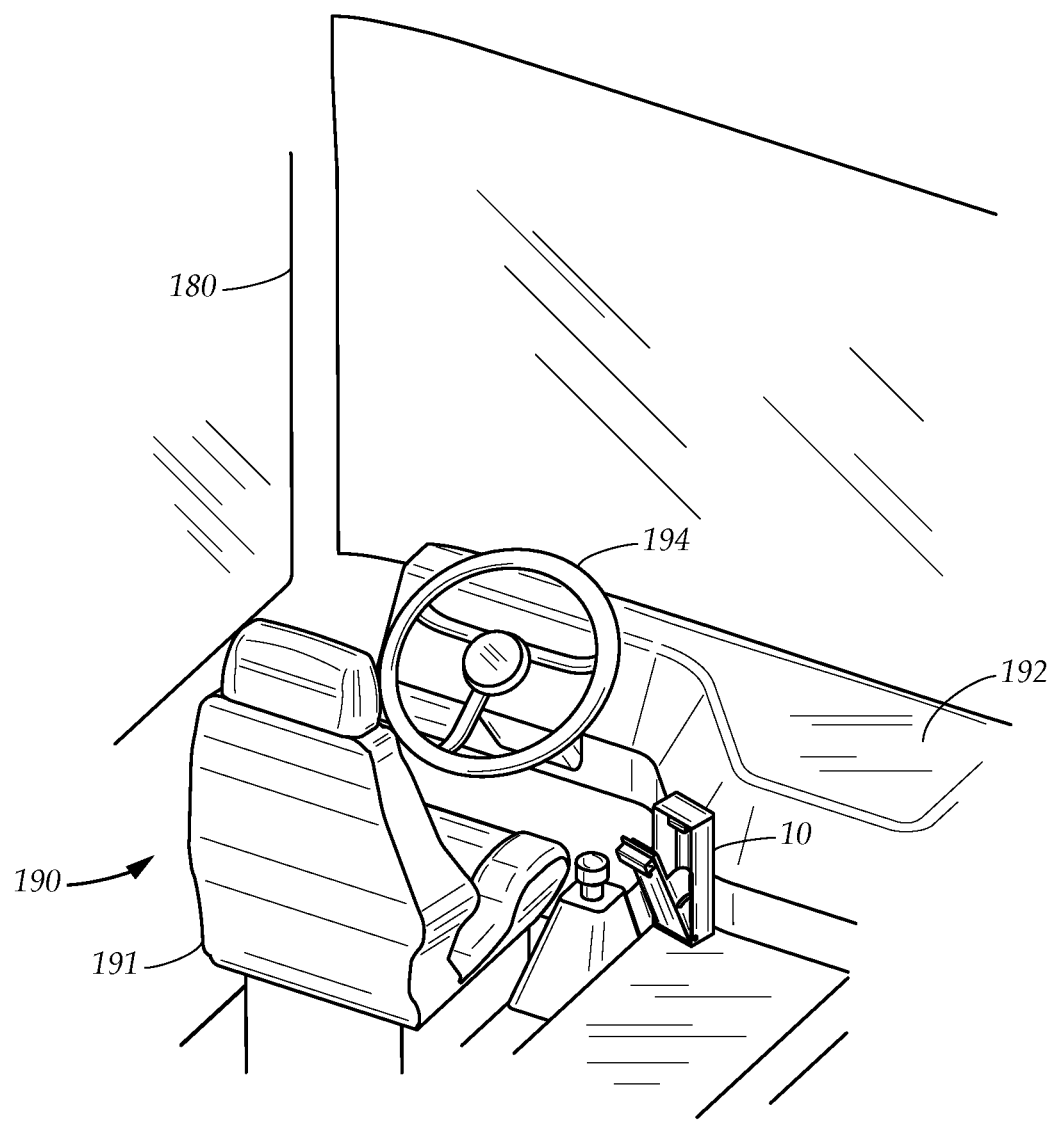
FIG. 7 is a diagrammatic perspective view, showing the enclosure mounted within a motor vehicle.

FIG. 7 illustrates the enclosure 10, mounted within a vehicle 180 having a vehicle interior 190 including a driver's seat 191, a dashboard 192, and a steering wheel 194. The enclosure 10 is mounted adjacent to the driver's seat 191. In accordance with the principles of the present disclosure, a user must place his or her electronic device within the enclosure prior to operating the vehicle, and while the vehicle is in operation. More specifically, before the engine can start, and at all times while the ignition system solenoid is activated, the electronic device must be within the enclosure 10 with its door securely closed. And once the door is closed, and the ignition key is on, the locking mechanism will prevent the door from opening until the ignition key is turned off. Thus, the user/driver cannot use the electronic device while operating the vehicle and is thereby prevented from being distracted by the electronic device.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented an enclosure for preventing use of an electronic device while operating a motor vehicle. The disclosure is illustrated by example in the drawing figures, and throughout the written description. It should be understood that numerous variations are possible, while adhering to the inventive concept. Such variations are contemplated as being a part of the present disclosure.

What is claimed is:

1. An enclosure for mounting in a motor vehicle and selectively housing an electronic device, the vehicle having an ignition key that is selectively on and selectively off and an ignition solenoid, comprising:
   a main part having a top panel having a front edge, a pair of main side panels, and a rear panel, the main side panels having a front edge and a bottom edge;
   a door having a front panel, a top edge, and a bottom edge, the door panel pivotally mounted to the main part at the bottom edge of the door and near the bottom edge and front edge of the main side panels, the door and main part together defining an interior volume adapted for enclosing the electronic device, the front panel having an open position wherein the door creates an opening between the top edge of the door and the top panel, and a closed position wherein the front panel is substantially parallel to the rear panel and coincident with the front edges of the main side panels; and
   a device responsive switch that is closed when the electronic device is within the enclosure;
   a door responsive switch that is closed when the door is in the closed position; and
   a pair of main contacts, adapted for connecting to the vehicle ignition solenoid and to the ignition key, the main contacts are closed to enable the solenoid when the device responsive switch is closed and the door responsive switch is closed, and is otherwise open.

2. The enclosure as recited in claim 1, further comprising a locking assembly for selectively holding the door in the closed position, wherein the locking assembly is engaged when the ignition key is on, the door responsive switch is closed, and the device responsive switch is closed.

3. The enclosure as recited in claim 2, wherein the locking assembly further comprises a magnetically attractive plate attached to the door near its top edge, and an electromagnet attached to the top panel near the front edge.

4. The enclosure as recited in claim 3, wherein the door is hingedly attached to the main part near the bottom edge of the door and the bottom edge of the front side panels, and wherein the door further comprises at least a pair of door side panels, the door side panels each having an arcuate slot; wherein the main part further comprises a pair of guide pins, each guide pin extending inwardly from one of the main side panels; and wherein each guide pin engages the one of the arcuate slots to define a range of travel for the door.

5. The enclosure as recited in claim 4, wherein the door has a base near the bottom edge of the door, extending between the side panels and front panel, the base having a base top panel and a base back panel, the door further having a device cradle attached to the base top panel, the device responsive switch is located on the base immediately adjacent to the device cradle and adapted so that when the device is place in the device cradle, the the device responsive switch is closed.

6. The enclosure as recited in claim 5, wherein the door responsive switch is located on the base back panel, so that when the door is in the closed position the door responsive switch contacts the rear panel of the main part to close the door responsive switch.

7. An enclosure for mounting in a motor vehicle and selectively housing an electronic device, the vehicle having an ignition key that is selectively on and selectively off and an ignition solenoid, comprising:
   a main part having a top panel having a front edge, a pair of main side panels, and a rear panel, the main side panels having a front edge and a bottom edge;
   a door having a front panel and a base, the base having a base top, the door has a device cradle adapted for holding the electronic device, the door having an open position and a closed position;
   a device responsive switch located in the base adjacent to the device craddle, the device responsive switch is adapted to close when the electronic device is within the device cradle;
   a door responsive switch that is closed when the door is in the closed position; and
   a pair of main contacts, adapted for connecting to the vehicle ignition solenoid and to the ignition key, the main contacts are closed to enable the solenoid when the device responsive switch is closed and the door responsive switch is closed, and is otherwise open.

8. The enclosure as recited in claim 7, wherein the base has a base back, wherein the door responsive switch is located on the base back panel, so that when the door is in the closed position the door responsive switch contacts the rear panel of the main part to close the door responsive switch.

9. The enclosure as recited in claim 8, further comprising a locking assembly for selectively holding the door in the closed position, wherein the locking assembly is engaged when the ignition key is on, the door responsive switch is closed, and the device responsive switch is closed.

10. The enclosure as recited in claim 9, wherein the locking assembly further comprises a magnetically attractive plate attached to the front panel of the door, and an electromagnet attached to the top panel near the front edge.

11. The enclosure as recited in claim 10, wherein the door has a bottom edge and a top edge, the door is pivotally mounted to the main part at the bottom edge of the door and near the bottom edge and front edge of the main side panels, the door and main part together defining an interior volume adapted for enclosing the electronic device.

12. The enclosure as recited in claim 11, wherein the door further comprises at least a pair of door side panels, the door side panels each having an arcuate slot; wherein the main part further comprises a pair of guide pins, each guide pin extending inwardly from one of the main side panels; and wherein each guide pin engages the one of the arcuate slots to define a range of travel for the door.

13. A method of preventing use of an electronic device while operating a motor vehicle, the vehicle having an ignition system including an ignition key, using an enclosure having a door having an open position and a closed position, the enclosure has a pair of main contacts, comprising the steps of:
   opening the door;
   enabling the ignition system to operate the vehicle by closed circuiting the main contacts by placing the electronic device inside the enclosure and then closing the door; and
   locking the electronic device within the housing by locking the door while the ignition key is on.

14. The method of preventing use of an electronic device while operating a motor vehicle as recited in claim 13, wherein the enclosure has a device responsive switch and a door responsive switch, and wherein the step of enabling the ignition system to operate further comprises closing the device responsive switch by placing the electronic device inside the enclosure, and closing the door responsive switch by closing the door.

* * * * *